April 29, 1969 J. J. STEINMETZ, JR 3,441,814

INTERLOCKING MULTIPLE ELECTRICAL CONTACT STRUCTURE FOR COMPRESSION BONDED POWER SEMICONDUCTOR DEVICES

Filed March 30, 1967

United States Patent Office 3,441,814

Patented Apr. 29, 1969

3,441,814

INTERLOCKING MULTIPLE ELECTRICAL CONTACT STRUCTURE FOR COMPRESSION BONDED POWER SEMICONDUCTOR DEVICES

John J. Steinmetz, Jr., Monroeville, Pa., assignor to Westinghouse Electric Corporation, Pittsburgh, Pa., a corporation of Pennsylvania Filed Mar. 30, 1967, Ser. No. 627,148
Int. Cl. H01p *1/10*
U.S. Cl. 317—234 12 Claims

ABSTRACT OF THE DISCLOSURE

This invention provides a multiple electrical contact assembly suitable for use in compression bonded encapsulated semiconductor devices. The multiple electrical contact comprises a first electrical contact disposed in an aperture in a deformable member of a second electrical contact. Upon application of a force to the multiple contact assembly, the deformable member of the second electrical contact is caused to flow about the first electrical contact urging it to move along its vertical axis in a downward direction and locking it in place. In this manner, the multiple electrical contact assembly is able to be electrically connected to two or more regions of a semiconductor element upon which it is disposed.

The invention described herein was made in the performance of work under a NASA Contract and is subject to the provisions of section 305 of The National Aeronautics and Space Act of 1958, Public Law 85–568 (72 Stat. 435; 42 U.S.C. 2457).

BACKGROUND OF THE INVENTION

*Field of the invention*

This invention relates to an interlocking pressure electrical contact for compression bond encapsulated semiconductor devices.

*Description of the prior art*

Heretofore, in compression bonded encapsulated electrical devices, when a multiple electrical connection was made to two different regions of semiconductivity on the same surface of an element, spring means were employed to urge all the components into electrical contact with each other. Usually one of the spring means was a coil spring, the length of which governs, in part, the overall height of the assembled device.

SUMMARY OF THE INVENTION

In accordance with the present invention there is provided a multiple electrical contact assembly comprising a partially deformable cushioning member, the cushioning member having a top surface, a bottom surface, and a centrally disposed aperture, the aperture extending from the top surface to the bottom surface; an electrically and thermally conductive contact member disposed on at least a portion of the top surface and the bottom surface, and enclosing at least a part of the outer periphery of the cushioning member; an interlocking body member disposed within the aperture of the cushioning member, the body member having a top surface, bottom surface, and an outer surface, the outer surface comprising a first portion extending substantially vertically downward from the top surface to a first point intermediate the top surface and the bottom surface, a second portion comprising an inclined surface extending upwardly from the bottom surface to a second point intermediate the top surface and the bottom surface, and a third portion extending from the first point to the second point; and an electrical lead, the electrical lead being electrically connected to the top surface of the interlocking body member.

An object of this invention is to provide a pressure electrical contact suitable for use in a compression bond encapsulated semiconductor device wherein the contest is retained in electrical contact with a semiconductor element without the need of a resilient force member acting upon the contact.

Another object of this invention is to provide a pressure electrical contact suitable for use in a compression bond encapsulated semiconductor device in which the contact is retained in electrical contact with one region of a semiconductor element by being interlocked with a second electrical contact in electrical contact with a second region of the same semiconductor element.

Other objects of the invention will, in part, be obvious and will, in part, appear hereinafter.

DRAWINGS

In order to more fully understand the nature and objects of this invention, reference should be had to the following drawings in which.

DESCRIPTION OF THE INVENTION

Figures 1, 2, 3:
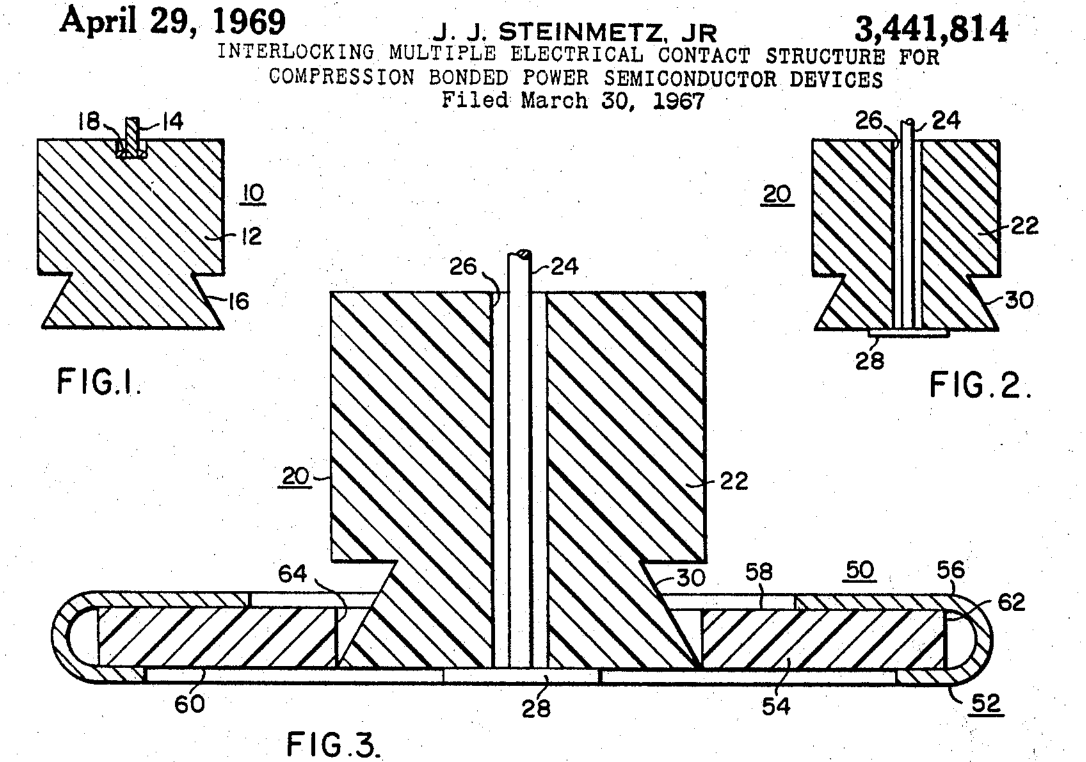
FIGS. 1 and 2 are views, partially in cross section, of interlocking electrical contact assemblies made in accordance with the teachings of this invention.
FIG. 3 is a view, partially in cross section of a multiple electrical contact assembly made in accordance with the teachings of this invention.

With reference to FIG. 1, there is shown an electrical contact assembly 10. The contact assembly 10 consists of an interlocking body member 12 comprised of an electrically conducting material and an electrical lead 14 joined to the body 12.

The interlocking body member 12 has a lower portion of its outer surface forming an upwardly inclined surface 16 which extends from the lower outer peripheral edge of the body 12 to a point between the center of the body 12 and the outer surface. The body 12 and the lead 14 each comprise a material such, for example, as copper, silver and aluminum. The lead 14 may be joined to the body member 12 by any suitable means known in the art such, for example, as by a layer 18 of electrical solder material.

The body member 12 may have an alternate physical shape which is not shown. The inclined surface 16 may be joined to the upper portion of the body by an axially disposed member having a smaller cross section than the upper portion.

Referring now to FIG. 2, there is shown an electrical contact assembly 20 which is a modification of the assembly 10. The contact assembly 20 consists of an interlocking body member 22 of an electrically insulating material and an electrical lead 24. The member 22 has a through aperture 26 through which the lead 24 passes and terminates in a button shaped contact 28. The lower portion of the outer surface of the member 22 forms an upwardly extending inclined surface 30 which extends from the lower outer peripheral edge of the body member 22 to a point between the wall of the aperture 26 and the outer surface of the member 12.

The material comprising the interlocking body member 12 must be able to withstand the operating temperature of a semiconductor device in which the assembly 20 is a component part without appreciable distortion or permanent deformation while undergoing a compressive force. Expected temperatures which the material may experience are as high as 200–250° C. Suitable materials for the body member 22 are polytetrafluoroethylene and polytrifluoromonochloroethylene, each of which contain a suitable additive material such, for example, as fiberglass.

The electrical lead 24 may be any suitable electrically conducting material such, for example, as silver, copper or aluminum.

With reference to FIG. 3 there is shown a multiple electrical contact assembly 50 suitable for use in compression bonded encapsulated semiconductor devices. The multiple electrical contact assembly 50 preferably comprises the interlocking elecrtical contact assembly 20 and a second electrical contact assembly 52 comprising an apertured cushioning member 54 and an electrically and thermally conductive contact member 56.

The cushioning member 54 has a top surface 58, a bottom surface 60, a peripheral edge 62 and an aperture 64 extending entirely through the member 54 from the top surface 58 to the bottom surface 60.

The member 54 consists of a material which compensates for any uneven surface area with which either, or both, of the surfaces 58 and 60, comes into contact. The material has physical properties which will allow it to cold flow under pressure. The cold flow proceeds only to a given limit and then essentially ceases whereupon the member 54 acts as a rigid member.

Upon assuming the property of a rigid member, the material of the member 54 continually transmits any force applied to either surface 58 or 60 without any appreciable cold flowing occurring. At a temperature level as high as from 200° C. to 250° C., but preferably lower, and under a pressure preferably exceeding 800 pounds per square inch, the allowable further deformation of the member 54 must be as little as possible in order to protect the functional reliability of the electrical device utilizing the member 54.

Preferred materials for the member 54 having the desired properties mentioned above are polytetrafluoroethylene and trifluoromonochloroethylene. These two materials in addition to having the desired properties, also are good electrically insulating materials for the operating range of electrical devices up to approximately 250° C.

The surfaces 58 and 60 of the member 54 are two major surfaces opposed to, and substantially parallel to each other. The electrically and thermally conductive contact member 56 is disposed about the outer periphery, and on a portion of each of the outer peripheral portions of the major surfaces, of the member 54. The member 56 is designed to leave a space between the outer peripheral edge 62 of the member 54 and the contact member 56. This space permits the member 54 under pressure to have freedom of movement to flow in all directions.

The contact member 56 comprises a metal selected from the group consisting of copper, gold, silver, nickel, tin, indium and base alloys thereof.

When a force is applied to the contact assembly 52 of the multiple contact assembly 50, the member 54, being under pressure, flows in all directions. The surfaces 58 and 60 of the member 54 flow until they conform to all those portions of surfaces in physical contact with them particularly, the surfaces of the contact member 56 and the inclined surface 30 of the contact assembly 20. The surfaces 58 and 60 of the member 54 flow about portions of the contact member 56 until the outside surface of the member 56 and the surfaces 58 and 60 of the member 54 are essentially in the same plane. Meanwhile other portions of the member 54 flow to partially fill the space defined by the outer peripheral edge 62 of the member 54 and portions of the inner surface of the contact member 56 as well as flowing about the lower portion of the surface 30. The material of the member 56 which flows about the lower portion of the surface 30 locks the contact assembly 20 in place preventing it from being dislodged upwardly. To prevent the accidental dislodgement upwardly of the contact assembly 20, the width of the body 22 is made slightly larger than the diameter of the aperture 64. The material comprising the body 22 of the contact assembly 20 has an inherent physical property to better resist cold flowing as well as resisting creeping at elevated temperatures than the material comprising the member 54.

The contact assembly 20 may be replaced with the contact assembly 10 as shown, or the modified version (not shown) in the multiple electrical contact assembly 50.

Figure 4:
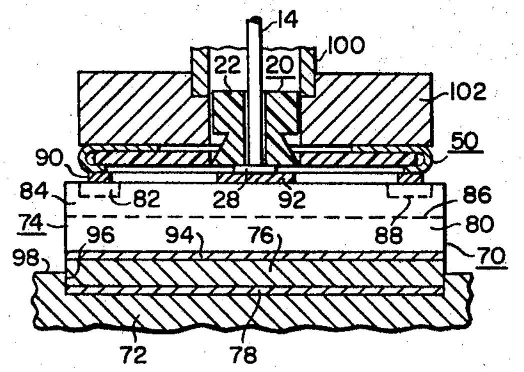
FIG. 4 is a view, partially in cross section of a portion of an electrical device.

With reference to FIG. 4, there is shown a portion of a compression bonded electrical device embodying the multiple electrical contact assembly 50.

The portion of the compression bonded electrical device comprises a semiconductor assembly 70, the multiple electrical contact assembly 50 and base 72 of a case.

The semiconductor assembly 70 comprises a semiconductor element 74, an electrical contact 76 and a layer 78 of a malleable electrically and thermally conductive metal.

The semiconductor element 74 comprises a body of a semiconductor material selected from the group consisting of silicon, silicon carbide, germanium, compounds of Group II and Group V elements, the compounds of Group II and Group VI elements. The element 74 has two regions 80 and 82 of a first type semiconductivity and one region 84 of a second type semiconductivity, a p-n junction 86 between regions 80 and 84, and a p-n junction 88 between regions 82 and 84.

An annular electrical contact 90 is disposed on an outer peripheral portion of the element 74 in an electrically conductive relationship with the region 82 of first type semiconductivity. A button shaped electrical contact 92 is centrally disposed on the same surface of the element 74 as the contact 90 and in an electrically conductive relationship with the region 84 of second type semiconductivity.

The element 74 is joined to the electrical contact 76 with a suitable solder layer 94 comprising such, for example, as a silver-lead-antimony solder alloy.

The electrical contact 76 has a thermal expansion characteristic closely matched to the semiconductor element 74. The contact 76 also is a firm support for the element 74. The contact 76 comprises a metal selected from the group consisting of molybdenum, tungsten, tantalum and base alloys thereof.

The contact 76 is disposed in a recess 96 within a top surface 98 of the base 72 with the layer 78 of a malleable, electrically and thermally conductive metal selected from the group consisting of gold, silver, tin, and aluminum positioned between the contact 76 and the surface of the recess 96 within the base 72. A hollow copper electrical connector 100 extends upwardly from a copper washer 102. The body member 22 of the contact assembly 20 is slidably mounted inside the hollow connector 100.

The electrical contact assembly 10 may be substituted for the contact assembly 20 in the multiple contact assembly 50. However, an electrically non-conducting layer of material must be placed between the body 12 and the hollow connector 100 and the washer contact 102 to prevent short circuiting from occurring.

Figure 5:
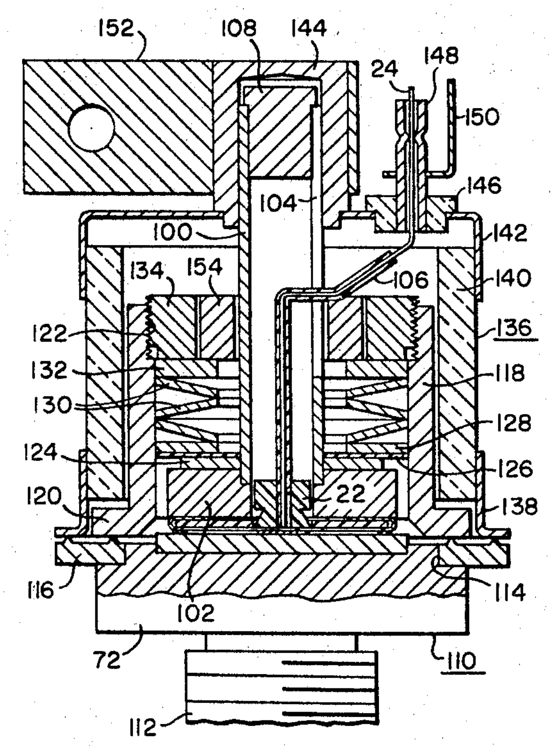
FIG. 5 is a view, partially in cross section of an electrical device embodying the teachings of this invention.

Referring to FIG. 5 in part, electrical lead 24 extends through a slot 104 in the side wall of the hollow connector 100 and down through the center of the body member 22 and terminates in the button-shaped contact member 28, FIG. 4. A layer 106 of electrical insulation is disposed about the lead 24 and the lower end of the insulation layer 106 is sealed within the body 22.

A force is maintained on the button-shaped contact member 28 by means of the body 22 locked in place by the deformable member 54 (FIG. 3) of the contact assembly 52. A plug 108 fits tightly into the upper end of the hollow connector 100.

Referring again to FIGS. 3 and 4, the electrical contact assembly 52 of the multiple contact assembly 50 is disposed between the copper washer 102 and the contact 90. A portion of the body 22 projects through the aperture 64 of the member 54. When a force is applied to the multiple contact assembly 50 the washer 102 is forced into electrical contact with the contact member 56 of the contact assembly 52, which, in turn, is then forced into an electrical contact with the electrical contact 90. The applied force causes the member 54 to partially flow until it reaches its semirigid state. Before reaching its semi-rigid state, the member 54 flows enough to mold itself to all opposing surfaces adjacent to the surfaces 58, 60 and 64 of the member 54. Upon reaching the semi-rigid state the member 54 transmits the applied force uniformly distributed over the surface of element 74 and the element's contact 90 whereby electrical contact is maintained between the washer 102 and the contact 90 by the contact member 56 of the contact assembly 52.

Upon application of the force, the contact 28 at the end of the lead 24 and the electrical contact 92 of the element 74 are also electrically connected. The cold flowing of the member 54 causes the walls of the aperture 64 to mold themselves about the lower portion of the surface 30 of the body 22. This action forces the body 22 and consequently the lead 24 and the contact 28 to move downwardly, making the electrical connection between the contacts 28 and 92. The cold flowing of the material of the member 54 "locks" the body 22 in place also.

With reference to FIG. 5, there is shown a compression bonded electrical device 110 which comprises in part the portion of the electrical device shown in FIG. 4 and hereinbefore described.

The device 110 comprises the pedestal 72 which may be made of copper, brass, aluminum or any other suitable electrically and thermally conducting material. The pedestal 72 has at its lower end a screw-threaded portion 112 for assembling the device 110 into electrical apparatus. Tha pedestal 72 is provided with a peripheral shoulder 114 to which a weld ring 116 is attached by suitable means such, for example, as a layer of silver braze material (not shown).

An inner case 118 having an outwardly extending flange portion 120 at its lower end and an internally threaded upper portion 122 is joined to the weld ring 116 at the flange portion 120. The semiconductor assembly 70 is placed in the recess 96 of the pedestal 72 and within the inner case 118. The multiple electrical contact assembly 50 is then disposed within the inner case 118 on the semiconductor assembly 70.

A first metal thrust washer 124 is placed on top of the washer 102, an electrical insulating washer 126 is placed over the hollow connector 100 and disposed on top of the thrust washer 124. A second metal thrust washer 128 is disposed on top of the insulating washer 126. At least one convex spring washer 130 is placed over the hollow connector 100 and disposed on the thrust washer 128. A third metal thrust washer 132 is placed over the hollow connector 100 and disposed on the spring washer 130.

A predetermined force is applied to the third metal thrust washer 132 to resiliently urge the electrical multiple contact assembly 50, the semiconductor assembly 70 and the pedestal portion 72 into an electrical and thermal conductive relationship. While maintaining the predetermined force application, an externally threaded apertured plug 134 is placed over the hollow connector 100 and screwed down into the inner case 118 to retain the desired predetermined force.

After the device 110 has been assembled in the manner described above, the entire assembly is enclosed within a header 136.

The header 136 comprises a weld flange 138, ceramic side walls 140, a metal top plate 142, a metal cup shape member 144, a ceramic insulator 146, a metallic tube 148, a first electrical connecting tab 150 and a second electrical connecting tab 152. The housing 136 is joined to the weld ring 116 through the weld flange 138.

The lead 24 passes upwardly through the metallic tube 148. The metallic tube 148 is then sealed to provide a hermetic seal for all the components within the housing 136.

The second electrical connecting tab 152 and the cup shape member 144 are crimped about the upper portion of the hollow connector 100 in the area of the plug 108 to provide an electrical connecting means between a portion of the contact assembly 50 and an electrical circuit external to the device 110.

Although not required, it is preferred that an apertured molecular sieve 154 is disposed about the hollow connector 100, seated on the third metal thrust washer 132 and within the aperture of the threaded plug 134. The sieve 154 serves a moisture gettering device.

The following examples are illustrative of the teachings of this invention:

Example I

A good electrically and thermally conductive massive metal member having an integral threaded stud was prepared from a piece of copper alloy. The finished machined configuration was the same as illustrated in FIG. 5. A steel weld ring was silver brazed to the massive metal member. A steel inner case was resistance welded to the steel weld ring.

A layer of silver was then disposed within the inner case and positioned in the recess of the top surface of the pedestal portion of the massive metal member.

A silicon semiconductor transistor element was prepared. The element consisted of a first major region of n-type semiconductivity and a second major region of p-type semiconductivity. An annular region of n-type semiconductivity was formed in the region of p-type semiconductivity. An exposed surface of major proportion of the p-type semiconductivity and an exposed surface of the annular region of n-type semiconductivity comprised the top surface of the element.

Employing suitable masking techniques and a metal evaporation chamber, an annular aluminum electrical contact and a centrally disposed aluminum electrical contact disc, were each vapor deposited on the exposed surfaces of the respective n-type and p-type regions of the top surface of the element. Each contact was 30,000 angstrom units in thickness.

The semiconductor element was affixed to a molybdenum electrical contact by disposing a layer of Ag-Pb-Sb alloy electrical solder material between the bottom surface of the element and the top surface of the contact. The element and the contact, each affixed to each other, was then disposed on the layer of silver within the recess of the layer of silver within the recess of the pedestal.

To fabricate the multiple contact assembly, a slot was machined in the wall of a small length of copper tubing which comprised the hollow electrical connector. The slot extended from one end of the tubing almost to the other end. The tubing was then brazed to a copper washer.

A piece of polytetrafluoroethylene having 25 percent by volume of fiber glass as a filler material was machined to configuration shown in FIG. 1 to produce the electrically insulated body. The lead, with the button shaped electrical contact, which was disposed in the body was made of silver. The insulating jacket for the silver lead was made of polytetrafluoroethylene. The lead was formed to protrude out through the slot in the hollow connector.

A copper plug was inserted into the open end of the hollow connector and then crimped in several locations to retain it permanently in place. The electrical lead and the electrically insulated body was then disposed within the connector on the micra washer with the portion of the plug containing the button shape contact of the lead projecting through the aperture of the copper washer.

An electrical contact assembly as shown in FIG. 3, item 52, was fabricated by forming a piece of silver metal into an electrical contact covering the outer peripheral portions of both the top and the bottom surfaces of an apertured polytetrafluoroethylene cushioning member 0.030 inch in thickness. The aperture of the cushioning member was slightly less than the width of the body of the contact assembly, item 12, FIG. 3, which protruded through the aperture.

The electrical contact assembly was disposed on the semiconductor element within the inner case and with the silver electrical contact in contact with the annular electrical contact of the element.

An apertured metal thrust washer and an apertured mica washer were each placed about the hollow connector, on the copper washer. A second steel apertured thrust washer was placed on top of the mica washer. Three steel apertured spring washers and a third steel apertured thrust washer were each disposed in turn on the second steel apertured thrust washer.

A force was applied to the uppermost metal apertured thrust washer to force all the components together into an electrical and thermal conductive relationship. The force was calculated to produce a pressure of approximately 1000 p.s.i. on the surface of the semiconductor element.

When the desired force reading was reached, an apertured threaded plug was screwed down within the inner case until sufficient contact was obtained between the plug and the uppermost steel apertured thrust member to retain the desired force reading.

The device was then heated to 200° C. and held at temperature for 16 hours. The device was then cooled to room temperature and subjected to electrical tests. The device performed electrically as well as prior art devices which required a spring within the hollow connector to assume a good electrical contact. The device was then disassembled.

Examination of the electrical contact assembly showed that the cushioning member had been deformed to flow about portions of all the surfaces with which it was in contact. In particular the material comprising the cushioning member had flowed about the lower portion of the inclined surface of the body locking the two contact assemblies of the multiple electrical together. The body 22 of the contact assembly 20, FIG. 2, showed no apparent signs of deformation.

It is apparent therefore that a spring is not required within the hollow conductor of a compression bonded electrical device having a multiple electrical contact in order to assume a good electrical contact between all mating contact surfaces. The physical design of the body with its inclined surface, or reverse chamber, permits one to use the body as a component in an interlocking multiple electrical contact assembly without fear of having an unreliable device. Elimination of the spring member within the hollow conductor permits one to design compression bonded encapsulated electrical devices having a reduced overall height.

Example II

A compression bonded encapsulated electrical device was fabricated in the same manner as the electrical device of Example I except for the following modifications:

The interlocking body was made of silver;

The base of the contact served as the electrical contact to the semiconductor element;

The silver electrical lead was silver soldered to the body; and

A hollow electrically insulating sleeve comprising polytetrafluoroethylene was disposed about the interlocking contact body and within the hollow conductor to prevent short circuiting between the two metal components.

Electrically the device functioned as well as the device of Example I and prior art devices. No electrical short circuiting was experienced.

Physical examination of the multiple electrical contact assembly showed that the deformed cushioning member had again locked the contact assemblies comprising the multiple contact assembly together. The cushioning member had to be destroyed in order to separate the two contact assemblies.

While this invention has been described with reference to particular embodiments and examples, it will be understood of course, that modifications, substitutions and the like may be made therein without departing from its scope.

I claim as my invention:

1. A multiple electrical contact assembly comprising:

(1) a partially deformable cushioning member, said cushioning member having a top surface, a bottom surface, and a centrally disposed aperture, said aperture extending from said top surface to said bottom surface;

(2) an electrically and thermally conductive contact member disposed on at least a portion of said top surface and said bottom surface, and enclosing at least a part of the outer periphery of said cushioning member;

(3) an interlocking body member disposed with said aperture of said cushioning member, said body member having a top surface, a bottom surface, and an outer surface, said outer surface comprising a first portion extending substantially vertically downward from said top surface to a first point intermediate said top surface and said bottom surface, a second portion comprising an inclined surface extending upwardly from said bottom surface to a second point intermediate said top surface and said bottom surface, and a third portion extending from said first point to said second point; and (4) an electrical lead, said electrical lead being electrically connected to said top surface of said interlocking body member.

2. The multiple electrical contact assembly of claim 1 in which the inclined angle between said inclined surface and said bottom surface is less than 90°.

3. The multiple electrical contact assembly of claim 2 in which the material comprising said interlocking body member and said electrical lead is one selected from the group consisting of silver, copper, aluminum and base alloys thereof.

4. The multiple electrical contact assembly of claim 1 in which said interlocking body member has an axially disposed aperture extending entirely through said member from said top surface to said bottom surface, and said electrical lead passes through said aperture.

5. The multiple electrical contact assembly of claim 4 in which the included angle between said inclined surface and said bottom surface is less than 90°.

6. The multiple electrical contact assembly of claim 5 in which said interlocking body member comprises a material selected from the group consisting of polytetrafluoroethylene, trifluoromonochloroethylene, polytetrafluoroethylene, and trifluoromonochloroethylene containing a fiber glass filler material, and the material comprising said electrical lead is one selected from the group consisting of copper, aluminum, silver, and base alloys thereof.

7. An electrical device comprising:

(1) an electrically and thermally conductive mounting surface;

(2) a body of semiconductor material disposed on said surface;

(3) an electrical contact assembly disposed on said body, said contact assembly comprising:

(a) a partially deformable cushioning member, said cushioning member having a top surface, a bottom surface, and a centrally disposed aperture, said aperture extending from said top surface to said bottom surface;

(b) an electrically and thermally conductive contact member disposed on at least a portion of said top surface and said bottom surface, and enclosing at least a part of the outer periphery of said cushioning member;

(c) an interlocking body member disposed within said aperture of said cushioning member, said interlocking body member having a top surface, a bottom surface, and an outer surface, said outer surface comprising a first portion extending substantially vertically downward from said top surface to a first point intermediate said top surface and said bottom surface; a second portion comprising an inclined surface extending upwardly from said bottom surface to a second point intermediate said top surface and said bottom surface, and a third portion extending from said first point to said second point; and (d) an electrical lead, said electrical lead being electrically connected to said top surface of said interlocking body member; and (4) force means for deforming said partially deformable cushioning member whereby at least a portion of the walls defining said aperture of said cushioning member are caused to conform to at least a portion of said second portion of said interlocking body members to cause said interlocking body member to electrically contact said body of semiconductor material.

8. The electrical device of claim 7 in which the included angle between said inclined surface and said bottom surface of said interlocking body member is less than 90°.

9. The electrical device of claim 8 in which the material comprising said interlocking body member and said electrical lead is one selected from the group consisting of silver, copper, aluminum and base alloys thereof.

10. The electrical device of claim 7 in which said interlocking body member has an axially disposed aperture extending entirely through said member from said top surface to said bottom surface, and said electrical lead passes through said aperture.

11. The electrical device of claim 10 in which the included angle between said inclined surface and said bottom surface of said interlocking body member is less than 90°.

12. The electrical device of claim 11 in which said interlocking body member comprises a material selected from the group consisting of polytetrafluoroethylene, trifluoromonochloroethylene, polytetrafluoroethylene containing a fiber glass filler material, and trifluoromonochloroethylene containing a fiber glass filler material, and the material comprising said electrical lead is one selected from the group consisting of copper, aluminum, silver, and base alloys thereof.

References Cited

UNITED STATES PATENTS 3,192,454 6/1965 Rosenheinrich et al. __ 317—234
3,358,196 12/1967 Steinmetz et al. ______ 317—234

JOHN W. HUCKERT, *Primary Examiner.*

R. SANDLER, *Assistant Examiner.*